(12) United States Patent
Attebery, II

(10) Patent No.: US 9,803,371 B2
(45) Date of Patent: *Oct. 31, 2017

(54) BUILDING VENEER SYSTEM

(71) Applicant: Talus Systems, LLC, Centennial, CO (US)

(72) Inventor: Harold C. Attebery, II, Granville, OH (US)

(73) Assignee: Talus Systems, LLC, Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/449,525

(22) Filed: Mar. 3, 2017

(65) Prior Publication Data
US 2017/0175398 A1   Jun. 22, 2017

Related U.S. Application Data

(63) Continuation of application No. 13/420,143, filed on Mar. 14, 2012, now Pat. No. 9,587,398.
(Continued)

(51) Int. Cl.
*E04B 5/04* (2006.01)
*E04C 2/04* (2006.01)
(Continued)

(52) U.S. Cl.
CPC ...... *E04F 13/0835* (2013.01); *B28B 23/0018* (2013.01); *E04B 1/66* (2013.01);
(Continued)

(58) Field of Classification Search
CPC ....... E04F 13/0835; E04F 13/24; E04F 13/14; E04F 13/147; E04F 13/0873;
(Continued)

(56) References Cited

U.S. PATENT DOCUMENTS 495,572 A   4/1893   Warnstorf
663,770 A   12/1900  Messerli
(Continued)

OTHER PUBLICATIONS

"Installation Guide," Masonry Veneer Manufacturers Association, 2009, retrieved from https://web.archive.org/web/*/http://www.masonryveneer.org/pdf/MVMAManualDesign_web.pdf, 48 pages.
(Continued)

*Primary Examiner* — Chi Q Nguyen
(74) *Attorney, Agent, or Firm* — Lewis Brisbois Bisgaard & Smith LLP; Craig W. Mueller

(57) ABSTRACT

A veneer product and system includes a body having an aesthetic front surface and a back surface for installation adjacent the building. The body has a top side and a bottom side and a bracket attached to body and projecting away from the back surface of the body, the bracket further comprising a first end adjacent the top side for attachment to the building and a first protrusion for positioning the back surface a predetermined distance from the building and a second end having a second protrusion for positioning the bottom of the back surface a predetermined distance from the building and a bottom projection adjacent the bottom side for engagement with a second body to retain the bottom end of the veneer product.

16 Claims, 7 Drawing Sheets

Related U.S. Application Data

(60) Provisional application No. 61/453,498, filed on Mar. 16, 2011.

(51) Int. Cl.

| | | |
|---|---|---|
| *E04F 13/08* | (2006.01) | |
| *E04B 1/66* | (2006.01) | |
| *E04F 13/14* | (2006.01) | |
| *E04F 13/24* | (2006.01) | |
| *B28B 23/00* | (2006.01) | |
| *B29L 31/10* | (2006.01) | |
| *E04B 2/96* | (2006.01) | |
| *E04B 1/68* | (2006.01) | |
| *E04B 1/76* | (2006.01) | |

(52) U.S. Cl.
CPC ...... *E04F 13/0862* (2013.01); *E04F 13/0873* (2013.01); *E04F 13/147* (2013.01); *E04F 13/24* (2013.01); *B29L 2031/10* (2013.01); *E04B 1/68* (2013.01); *E04B 1/7629* (2013.01); *E04B 2/965* (2013.01); *E04F 13/14* (2013.01)

(58) Field of Classification Search
CPC ............. E04F 13/0862; B29L 2031/10; B28B 23/0018; E04B 2/965; E04B 1/68; E04B 1/7629
USPC ... 52/712, 596, 311.3, 311.1, 598, 603, 314, 52/443, 555, 408; 249/98
See application file for complete search history.

(56) References Cited

U.S. PATENT DOCUMENTS

| | | | |
|---|---|---|---|
| 2,011,510 A * | 8/1935 | Ackenbrack | E04F 13/0846 52/385 |
| 2,528,205 A * | 10/1950 | Benevento | E04F 13/0841 29/432 |
| 2,823,399 A | 2/1958 | Stewart | |
| 2,924,963 A | 2/1960 | Taylor et al. | |
| 3,142,938 A | 8/1964 | Eberhardt | |
| 3,277,626 A | 10/1966 | Brynjolfsson et al. | |
| 3,377,764 A | 4/1968 | Storch | |
| 3,533,206 A | 10/1970 | Passeno, Jr. | |
| 3,621,625 A | 11/1971 | Medow | |
| 3,964,226 A | 6/1976 | Hala et al. | |
| 4,160,346 A | 7/1979 | Kaufmann | |
| 4,251,578 A | 2/1981 | Kaufmann | |
| 4,287,241 A | 9/1981 | Kaufmann | |
| 4,386,136 A | 5/1983 | Kaufmann | |
| 4,765,115 A | 8/1988 | Pollina | |
| 4,819,401 A | 4/1989 | Whitney, Jr. | |
| 4,843,776 A | 7/1989 | Guignard | |
| 4,852,320 A | 8/1989 | Ballantyne | |
| 4,869,038 A | 9/1989 | Catani | |
| 4,992,005 A | 2/1991 | Hilfiker | |
| 5,062,913 A | 11/1991 | Owens et al. | |
| 5,208,086 A | 5/1993 | Owens | |
| 5,228,937 A | 7/1993 | Passeno | |
| 5,265,396 A | 11/1993 | Amimoto | |
| 5,314,554 A | 5/1994 | Owens | |
| 5,373,676 A | 12/1994 | Francis et al. | |
| 5,392,581 A | 2/1995 | Hatzinikolas et al. | |
| 5,454,200 A | 10/1995 | Hohmann | |
| 5,490,366 A | 2/1996 | Burns et al. | |
| 5,501,049 A | 3/1996 | Francis et al. | |
| 5,555,690 A | 9/1996 | Cosentino | |
| 5,634,307 A | 6/1997 | Larriberot et al. | |
| 5,634,310 A | 6/1997 | Hohmann | |
| 5,671,578 A | 9/1997 | Hohmann | |
| 5,816,008 A | 10/1998 | Hohmann | |
| 5,836,572 A | 11/1998 | Sugiyama | |
| 6,164,029 A | 12/2000 | Lee | |
| 6,170,214 B1 | 1/2001 | Treister et al. | |
| 6,209,281 B1 | 4/2001 | Rice | |
| 6,279,283 B1 | 8/2001 | Hohmann et al. | |
| 6,315,489 B1 | 11/2001 | Watanabe | |
| 6,351,922 B1 | 3/2002 | Burns et al. | |
| 6,615,560 B2 | 9/2003 | Ito | |
| 6,668,505 B1 | 12/2003 | Hohmann et al. | |
| 6,789,365 B1 | 9/2004 | Hohmann et al. | |
| 6,830,405 B2 | 12/2004 | Watanabe | |
| 6,851,239 B1 | 2/2005 | Hohmann et al. | |
| 6,913,645 B2 | 7/2005 | McNulty, Jr. | |
| D510,146 S | 9/2005 | Attebery, II et al. | |
| 6,941,717 B2 | 9/2005 | Hohmann et al. | |
| 7,017,318 B1 | 3/2006 | Hohmann et al. | |
| RE39,091 E | 5/2006 | Kuelker | |
| 7,159,367 B1 | 1/2007 | King | |
| 7,225,590 B1 | 6/2007 | diGirolamo et al. | |
| 7,325,366 B1 | 2/2008 | Hohmann, Jr. et al. | |
| 7,736,096 B1 | 6/2010 | Aaron | |
| 8,033,069 B2 | 10/2011 | Hotchkiss, III | |
| 8,122,663 B1 | 2/2012 | Hohmann, Jr. et al. | |
| 8,151,530 B2 | 4/2012 | Schwarz et al. | |
| 8,387,323 B2 | 3/2013 | Mickelson | |
| 8,667,757 B1 | 3/2014 | Hohmann, Jr. | |
| 8,726,596 B2 | 5/2014 | Hohmann, Jr. | |
| 8,782,988 B2 | 7/2014 | Wolf et al. | |
| 8,833,003 B1 | 9/2014 | Hohmann, Jr. | |
| 9,021,767 B1 | 5/2015 | Barrett, Jr. et al. | |
| 9,027,302 B2 | 5/2015 | Buoni et al. | |
| 9,249,579 B2 | 2/2016 | Dickey et al. | |
| 2001/0054270 A1 | 12/2001 | Rice | |
| 2002/0046536 A1 | 4/2002 | Hotta | |
| 2003/0066259 A1 * | 4/2003 | Sudweeks | E04B 2/02 52/506.05 |
| 2003/0213212 A1 | 11/2003 | Passeno | |
| 2004/0040239 A1 | 3/2004 | Baillargeon | |
| 2004/0216408 A1 | 11/2004 | Hohmann | |
| 2005/0087908 A1 | 4/2005 | Nast et al. | |
| 2005/0102944 A1 | 5/2005 | Hikai | |
| 2005/0188642 A1 | 9/2005 | Correia | |
| 2005/0210811 A1 | 9/2005 | Nasvik | |
| 2005/0217192 A1 | 10/2005 | Boosy | |
| 2006/0005490 A1 | 1/2006 | Hohmann | |
| 2006/0026919 A1 | 2/2006 | Morse et al. | |
| 2006/0101752 A1 | 5/2006 | Sakai et al. | |
| 2006/0265988 A1 | 11/2006 | Fujito et al. | |
| 2006/0272261 A1 | 12/2006 | Ito | |
| 2007/0045897 A1 | 3/2007 | Alexander et al. | |
| 2007/0062138 A1 | 3/2007 | Wobber | |
| 2007/0078191 A1 | 4/2007 | Guhde et al. | |
| 2007/0130860 A1 | 6/2007 | Paquette et al. | |
| 2007/0209308 A1 | 9/2007 | Barrett | |
| 2008/0141605 A1 | 6/2008 | Hohmann | |
| 2008/0155922 A1 | 7/2008 | Wolf et al. | |
| 2009/0094914 A1 | 4/2009 | Jambois et al. | |
| 2009/0133357 A1 | 5/2009 | Richards | |
| 2009/0193742 A1 | 8/2009 | Wolf et al. | |
| 2009/0241451 A1 | 10/2009 | Griffiths | |
| 2010/0257803 A1 | 10/2010 | Hohmann | |
| 2011/0047919 A1 | 3/2011 | Hohmann | |
| 2011/0061333 A1 | 3/2011 | Bronner | |
| 2011/0094176 A1 | 4/2011 | Bronner | |
| 2011/0146195 A1 | 6/2011 | Hohmann | |
| 2011/0173902 A1 | 7/2011 | Hohmann et al. | |
| 2011/0175255 A1 | 7/2011 | Wernette et al. | |
| 2011/0277397 A1 | 11/2011 | Hohmann | |
| 2012/0241574 A1 | 9/2012 | Uota et al. | |
| 2012/0304576 A1 | 12/2012 | Hohmann | |
| 2013/0074442 A1 | 3/2013 | Hohmann | |
| 2013/0232893 A1 | 9/2013 | Hohmann | |
| 2013/0232909 A1 | 9/2013 | Curtis et al. | |
| 2013/0247483 A1 | 9/2013 | Hohmann | |
| 2013/0247484 A1 | 9/2013 | Hohmann | |
| 2013/0247498 A1 | 9/2013 | Hohmann | |
| 2013/0340378 A1 | 12/2013 | Hohmann | |
| 2014/0000211 A1 | 1/2014 | Hohmann | |
| 2014/0041331 A1 | 2/2014 | Buoni et al. | |
| 2014/0075855 A1 | 3/2014 | Hohmann | |
| 2014/0075856 A1 | 3/2014 | Hohmann | |
| 2014/0260033 A1 | 9/2014 | Hohmann | |

(56) References Cited

U.S. PATENT DOCUMENTS

2014/0260040 A1 9/2014 Hohmann
2014/0260051 A1 9/2014 Hohmann
2014/0311071 A1 10/2014 Curtis et al.
2016/0108623 A1* 4/2016 Attebery, II .......... E04F 13/007
52/302.1

OTHER PUBLICATIONS

"Welcome to Cosella-Dorken," Cosella-Dorken Products, Inc., 2011, retrieved from https://web.archive.org/web/20110723005431/http://www.cosella-dorken.com/bvf-ca-en/index.php, 1 pages.

"Versetta Stone," Boral Stone Products, retrieved from https://web.archive.org/web/20110513164732/http://masonry.owenscorning.com/versettastone, 12 pages.

Final Action for U.S. Appl. No. 14/516,572, dated Nov. 10, 2016, 15 pages.

Official Action for U.S. Appl. No. 14/516,572, dated Jun. 13, 2016, 30 pages.

Notice of Allowance for U.S. Appl. No. 13/420,143, dated Oct. 24, 2016, 5 pages.

Official Action for U.S. Appl. No. 13/420,143, dated Sep. 22, 2016, 11 pages.

* cited by examiner

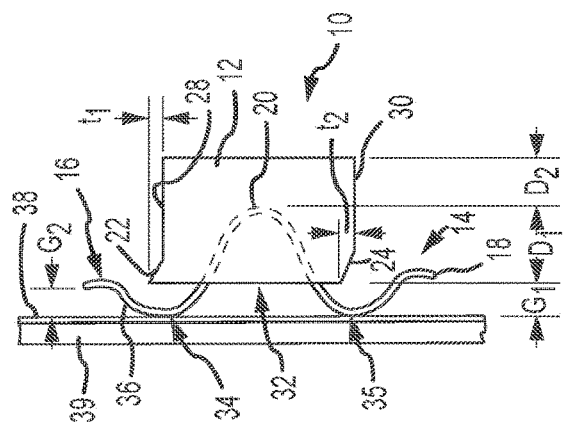
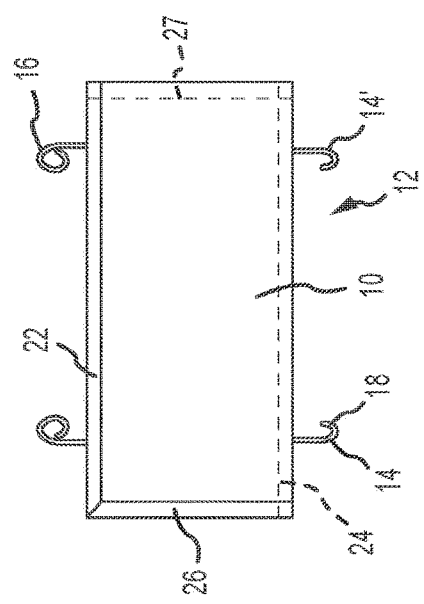
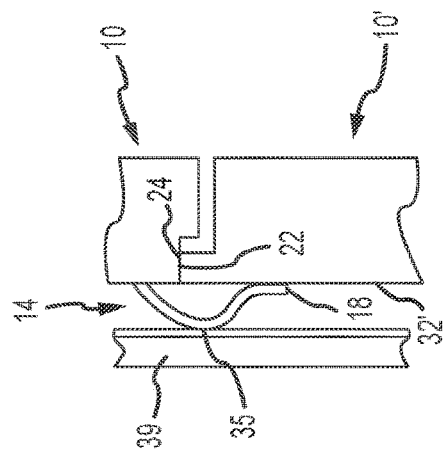
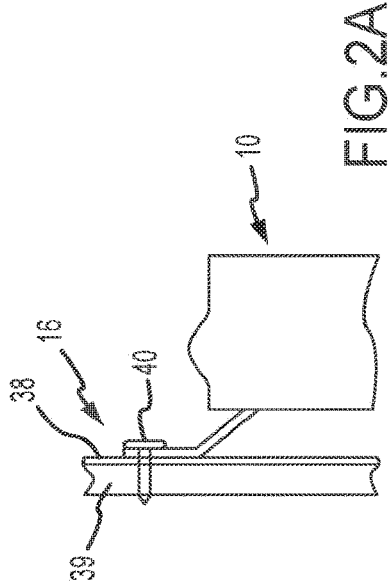
FIG. 1
FIG. 2
FIG. 2A
FIG. 3

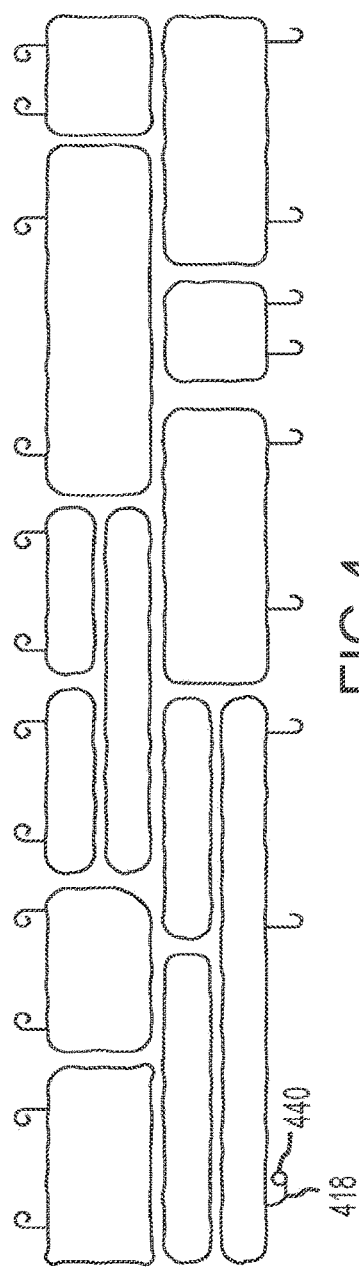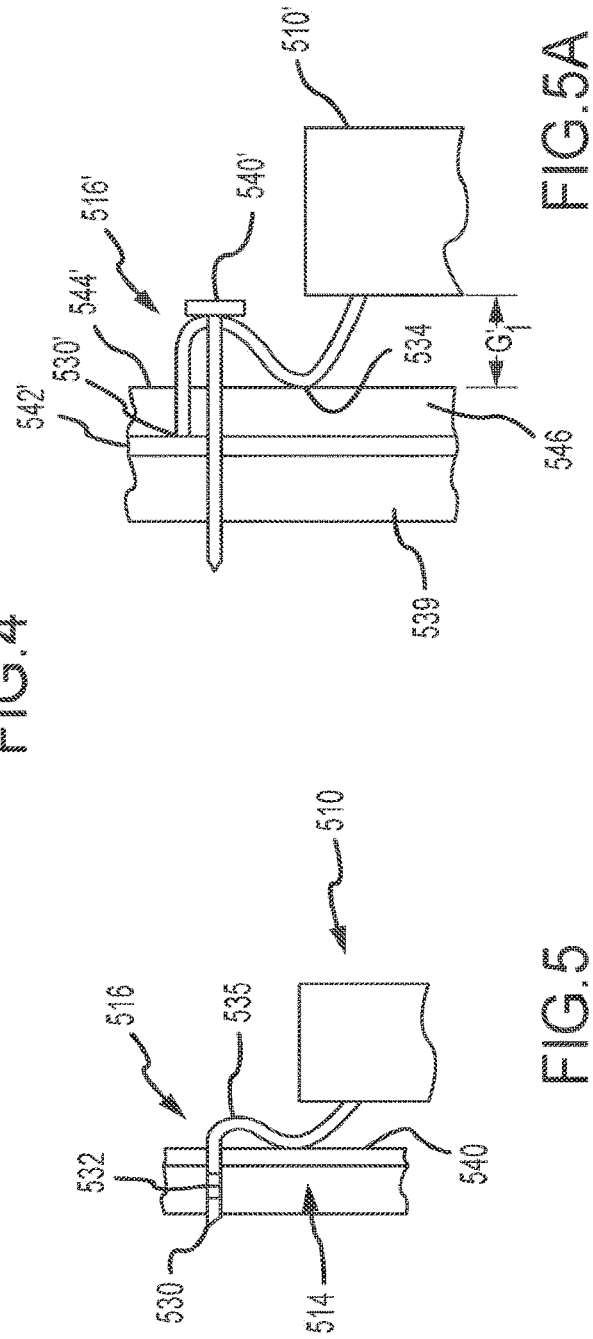

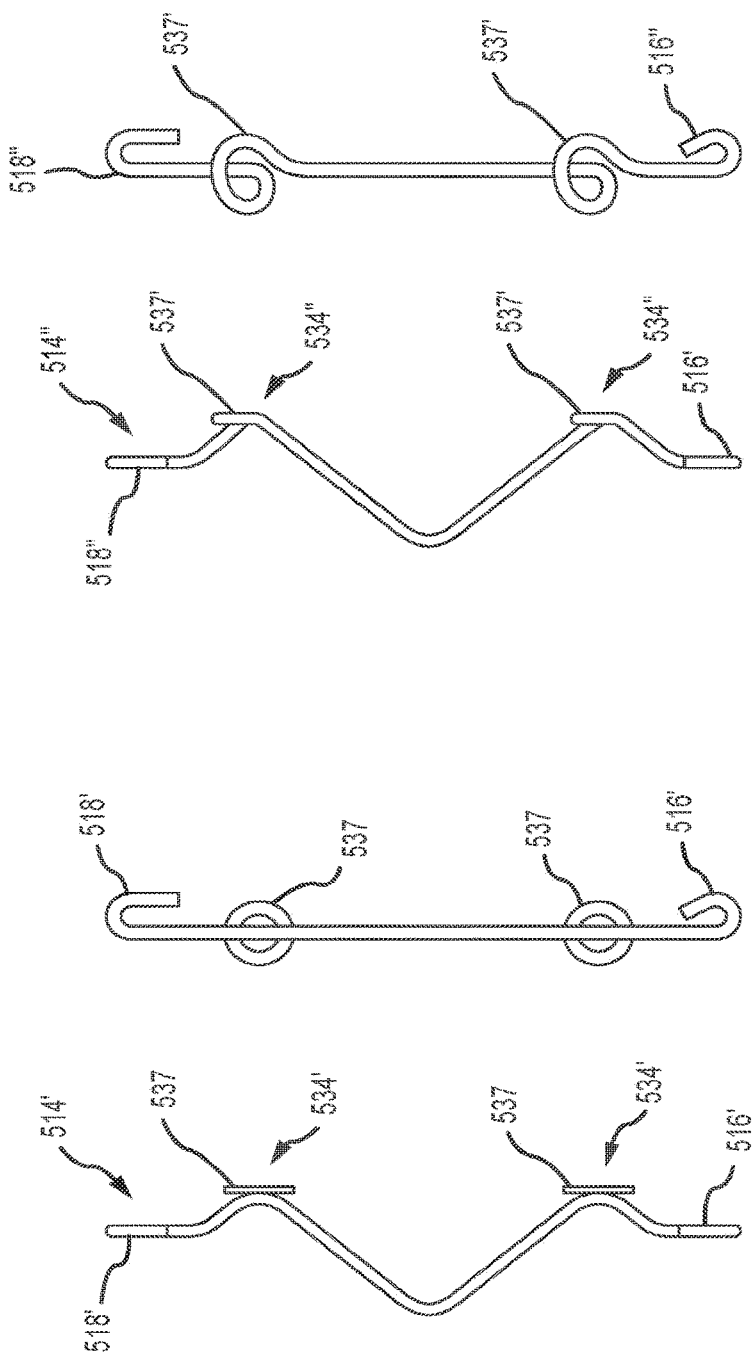

BUILDING VENEER SYSTEM

This application is a continuation of U.S. patent application Ser. No. 13/420,143, filed Mar. 14, 2012, now U.S. Pat. No. 9,587,398, issued Mar. 7, 2017, which claims the benefit of U.S. Provisional Patent Application Ser. No. 61/453,498, filed Mar. 16, 2011, the entire disclosures of which are incorporated by reference herein.

FIELD OF THE INVENTION

The present invention is in the technical field of masonry veneer products, and includes a system using such products. More particularly, the present invention is in the technical field of masonry veneer products installed without a scratch coat and lath system.

BACKGROUND OF THE INVENTION

Masonry veneer systems are commonly used for exterior cladding, as architectural or aesthetic features on residential and commercial buildings. Accepted methods for installing these products are set forth in detail by the Masonry Veneer Manufacturers Association (MVMA) in its Installation Guidelines for Adhered Concrete Masonry Veneer, a copy of which may be found online at http://www.masonrvveneer-.org/pd±1MVMAManualDesign web.pdf (Jun. 8, 2010 revision posted by MVMA as of the date of this application), which is incorporated herein by reference in its entirety. The MVMA includes the major manufacturers of man-made stone and veneer products.

As indicated by the MVMA, proper installation of stone on a framed building requires the installation of a weather resistant barrier (WRB), then application of a lath secured to the framing with corrosion resistant fasteners and a nominal ½ inch scratch coat of type N or type S concrete meeting ASTM C270. The lath must be properly applied to the wall to avoid intrusion of water, and to provide an acceptable structure to which the cladding will be adhered. The lath must be corrosion resistant, applied in an overlapping fashion, and with a corrosion resistant nail that penetrates the studding according to the MVMA recommendations. Additionally, the scratch coat must be applied using a correct mortar at the proper moisture content and thickness, embedded properly in the lath, allowed to cure to "thumb dry", the scratched to provide grooves, and allowed to cure. These additional products and steps add cost, additional labor and provide opportunities for human error, which can result in a poor installation and future problems. The installation of the WRB, lath and scratch coat must be performed up to 48 hours or more before the installation of the veneer product, allowing the scratch coat to properly cure. Further details are set forth in the MVMA installation guidelines.

Once the scratch coat is properly applied and cured, the adhered concrete masonry veneer (ACMV) products are then adhered to the scratch coat using a mortar applied to the ACMV. The MVMA guidelines recommend that the scratch coat should be moist cured to prevent cracking, and that both the scratch coat and the ACMV should be "dampened" when applying the ACMV, adding additional requirements on the installer. The installer typically will take individual ACMV products, "butter" the back of each individual product with mortar, and apply the "buttered" product to the scratch coat, forcing the mortar into the scratch coat to adhere the ACMV to the wall. The consistency of the scratch coat, mortar and skill of the installer each play a role in the reliability of the installation. Additionally, the installation should not be performed during rain or cold weather, thus limiting the time available (and time delay) for completion of the building. These all add to cost and customer dissatisfaction during the construction process.

Two major suppliers of commercially available veneer products include Cultured Stone® products, available from Boral Stone Products LLC., and Eldorado Stone and Eldorado Brick veneer products, available from Eldorado Stone, LLC. These products are typically installed as discrete individual stones or brick adhered to a scratch coat on the exterior of a building as described above. Stones are typically installed from the top of the building, and the wall is covered in a downward direction. If the wall is struck (e.g. if drywall is installed on the interior of the building) before the mortar is cured, the stone may be dislodged from the wall. This creates re-work for the installer, or partially dislodged stones may become loose at a later date.

An optional installation technique described in the MVMA guidelines includes a rain screen drainage plane system, which provides a space to permit incidental water to escape. The recommended ways to provide this space include a drainage mat, formed polymer sheeting (such as Delta®-Dry Stucco and Stone, available from Cosella-Dorken, ref http://vvvvw.coselladorken. corn), strapping or furring to provide the recommended MVMA air gap of 3/16 to % inch. These systems allow moisture to escape from behind the veneer, but add additional material and labor cost, time and complexity during installation of the ACMV product, and are not used in many installations.

Applicant offers a new product through his company (Advanced Building Solutions, or ABS, of Granville, Ohio) that comprises a panelized product for securing concrete veneer products to the exterior of a building. ABS's panelized product is named Talus Wall Systems, and is commercially available from ABS. A second panelized veneer product, Versetta Stone, is sold by Boral Stone, LLC. (http://masonry.owenscorning.com/versettastone). These panelized veneer products are secured to the exterior of a building using mechanical fasteners driven through a flange embedded in the top of the veneer product. These systems reduce some of the issues with the adhered ACMV products, because the lath, scratch coat and adhesive mortar can be eliminated in many installations of these panelized veneer products. However, these panelized veneer products are relatively large (typically about 8-10 inches high and approximately 32-36 inches wide). While this enables fast installation on structures where penetrations are not present (such as windows or outlets) or corners, the presence of these penetrations on most buildings results in a large number of panels being trimmed and a fairly large amount of waste (Boral's installation instructions instructs an installer to initially estimate 10% scrap). The large number of cuts takes time and produces excess waste. Additionally, these products are more expensive to manufacture, and the designs present challenges in manufacturing.

Accordingly, it would be desirable to provide an improved product and system for installing veneer products and to eliminate the lath and scratch coat.

SUMMARY OF THE INVENTION

In accordance with the purposes of the present invention as described herein, an improved masonry veneer product ("MVP") and system ("MVS") are provided. Such a product and system includes a bracket embedded in the product, the bracket having a first end for securing the upper end of the product to a building. In one embodiment, the bracket also creates an integral air gap behind the product for the escape of moisture. The bracket may include a second end for retaining the bottom end of the product to the building through an interference fit to an adjacent MVP. The system further includes a projection between adjacent MVP to impede moisture from passing between MVP's, and a WRB installed adjacent the structure and air gap to keep moisture from entering the structure.

BRIEF DESCRIPTION OF THE DRAWINGS

FIG. 1 is a schematic front view of a masonry veneer product according to the present invention;

FIG. 2 is a schematic end view of a masonry veneer product according to the present invention;

FIG. 2A is a schematic partial end view of a masonry veneer product according to the present invention with a fastener;

FIG. 3 is a schematic partial end view of two adjacent masonry veneer products according to the present invention;

FIG. 4 is a schematic side view of a wall having several masonry veneer products of the present invention installed;

FIG. 5 is a schematic partial end view of an embodiment of a masonry veneer product according to the present invention with a fastener projection;

FIG. 5a is a schematic partial end view of an embodiment of a masonry veneer product according to the present invention with a foam projection;

FIGS. 11A-14B are certain illustrative brackets useful with the present invention.

DETAILED DESCRIPTION OF THE INVENTION

Figure 6:
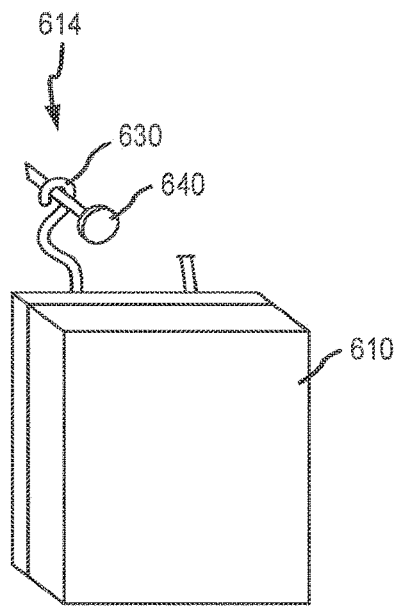
FIGS. 6 and 6A are schematic isometric and end views, respectively, of a masonry veneer product according to the present invention with a fastener.

Referring now to the invention in more detail, in FIG. 1 there is shown a masonry veneer product 10, illustrated schematically and described herein typically as a dry stack stone product body 12, similar to a typical box material in appearance, such as the ABS Ledge Rock, Cultured Stone® County Ledge or other such Dry Stack ACMV products that are currently available commercially available. However, the new MVP and MVS have additional inventive features as described herein. Furthermore, the present invention could be applied to nearly any texture of manufactured stone or brick, but is primarily illustrated with a dry stack installation for the sake of simplicity (and as a representative installation). An embodiment of the present invention used with a grouted texture preferably includes a flange on one of the top and bottom of the stone and a second flange on either the left or right end, the flanges each serving as a ledge for a grouted joint. One skilled in the art could modify the current design to utilize the present invention with other textures and configurations.

The embodiment shown in FIG. 1 includes a pair of brackets 14, 14' embedded in the product body 12. Each bracket includes a top end 16 and bottom end 18. The top end 16 is illustrated as having a looped construction for receiving a fastener 40 as illustrated in FIG. 2A. The bottom end 18 preferably includes a curved shape 18 for nesting under an adjacent masonry veneer product (as illustrated on FIG. 3). FIGS. 11-14 illustrate certain embodiments of brackets useful with the present invention (the figure "A" designation illustrating a side view and "B" designation illustrating a top view).

As further illustrated in FIG. 2, the bracket 14 is embedded into the stone body 12, with an intermediate portion 20 as shown in phantom in FIG. 2. The intermediate portion is embedded in the product body 12 a depth sufficient to ensure adequate engagement to support the stone body 12 when attached to a building (not shown), preferably for the life of the building. The brackets 14 penetrate the stone body 12 to a depth D1 that provides sufficient engagement between the bracket and cured concrete stone, but also which retains a thickness D2 of concrete that will ensure the face of the stone body 12 does not expose the wire or fracture during the life of the building. The brackets 14 are preferably formed from a wire that is corrosion resistant, such as a stainless steel or galvanized steel, and having sufficient strength and sufficient stiffness to not deform and to provide the installation with an interference fit at the bottom as described below. The bracket 14 should be rigid enough to withstand handling, packaging, transport and installation without excessive deformation. In another embodiment, the brackets 14 are formed from a fiberglass material, or any material known to one skilled in the art that is not corroded and will support the masonry product 10. In yet another embodiment (not shown), the brackets 14 are stamped from sheet metal or formed or molded from another non-corrosive material in a more flattened cross section.

As shown in the embodiment illustrated in FIGS. 1 and 2, the product 10 may include water shedding feature, which is described herein to include a flashing lip 22 along the top surface 28 of the stone body 12. This lip 22 is intended to inhibit the passage of moisture, such as wind driven rain, between the stone body 12 and an adjacent stone 10' as illustrated in FIG. 3. In such an embodiment, each stone body 12 may also include a corresponding recess 24 on the bottom surface 30 of the stone body 12 to correspond with the opposing lip 22 of the adjacent stone. This lip 22 and recess 24 also serve to obscure a view of the WRB installed beneath the stone to create a visually appealing dry stack installation. Additionally, the lip 22 may contact the body within the recess as illustrated in FIG. 3, thereby setting the gap between the products as illustrated in FIG. 4. In a similar manner, each stone preferably includes a lip 26 along one end of the stone body 12, and a corresponding recess 27 along the opposite end of the stone body 12, which will inhibit moisture intrusion, obscure visibility behind the product, and set the side to side gap. While the lips 22, 26 are illustrated in FIG. 1 as an angled or chamfered protrusion and recess, one skilled in the art appreciates that while not illustrated as such, the lips 22, 26 could be simple ridge similar to that illustrated in FIG. 2, a rabbet, shiplap as illustrated in FIG. 3, or other type of configuration that provides a moisture block and an improved line of sight.

In the embodiment illustrated in FIG. 2, the bracket 14 includes a first protrusion 34 formed in the bracket 14. The protrusion extends below the back surface 32 of the stone body 12 to bear against the structure 39 and create an air gap G1 under the product 10 when installed on a structure 39 as shown in FIG. 2, preferably installed over a WRB 38. In the illustrated embodiment, the bracket 14 includes a bend 36 which holds the top end 16 away from the structure 39 and WRB 38 to create a second gap G2. When the bracket 14 is secured through the WRB 38 to the structure 39 as illustrated in FIG. 2A, the top end is urged by the fastener 40 toward the structure 39. FIG. 2 illustrates the bracket as being deformed to make the end 16 flat against the WRB 38 after the fastener 40 is installed. This force on the top end 16 acts as a lever, which as illustrated in FIG. 3 urges the opposite second end 18 of the bracket 14 away from the structure 39 and toward the back surface 32' of a second body, such as an adjacent product 10'. Because the second end 18 is wedged below the lower product 10', this causes a second protrusion 35 at the bottom end 18 to be held securely against the structure 39 and therefore the product is secured both at the top by the nail and at the bottom by a wedging action against the second product 10'. In one embodiment (not illustrated), the top end of the bracket 14 does not have the bend 36, and the bottom end 18 of the bracket is bent to lie in a plane above the back surface 32 of the stone body 12 as illustrated in FIG. 2, so the bottom end 18 is installed under an adjacent product (not shown) simply using an interference fit. This interference may be at least 1 mm and could be 2, 3, 4, or 5 mm or more, depending on the stiffness of the bracket. Accordingly, the configuration of the bottom bracket illustrated in FIG. 2 may be used with or without the bent configuration of the top end 16 as illustrated in FIG. 2. Additionally, the second end 18 may be wedged against another body, such as a starter strip or an accessory, such as a ledge. In certain applications, it may be sufficient to fasten the second end using adhesives, nails, stapes, screws or the like as a substitute for the second body. While the protrusions are illustrated herein as bent wires, one skilled in the art appreciates that a different configuration could include a molded protrusion, a weldment, or other configurations to provide the desired gap.

A system including the product 10 described above includes a building structure 39 (such as a frame and sheathing or concrete structure), a weather resistant barrier installed over the structure (similar in nature and installation to that specified by the MVMA), a plurality of products 10 attached to the structure over the WRB 38 and attached to the structure 39 using fasteners 40 projecting through the brackets 14. The fasteners 40 are preferably non-corrosive, such as galvanized roofing nails, screws or staples; provided however that the fasteners must provide sufficient strength to secure the product 10 to the structure 39 for the life of the structure.

In one embodiment, installation begins from the bottom of the building. In such an instance, a starter strip (such as a J-channel) is installed to the building in a level manner. The J-channel strip will align the bottom row of product in a straight line. Because the bottom row of product has a bottom end 18 which projects below the product, in one embodiment a J-channel includes a recess to engage the bottom end 18. In another embodiment, the installer bends the bottom end e.g. as illustrated in FIG. 4 at 418 to position the hook close to the body for fitment into the J-channel (not shown). A corrosion resistant fastener 410 may then be used to secure the bottom end 418, or the J-channel may sufficiently retain the bottom end 418. Similarly, one skilled in the art appreciates that either a starter strip or weep screed should provide ventilation at the bottom, and therefore accommodations should be made to provide for air passage. Once the first row is secured to the wall using the J-channel and securing the top end 16 of the brackets as described above, the second row is installed by inserting the bottom ends 18 of the second row of products behind the rear surface 32 of the first row of products previously installed. Then the top end of successive rows of the product being installed is pushed against the structure 39 and secured at the top end 16 as described above.

The top row of the product may be capped or may extend to the soffit. In either event, it is desirable to include an air gap where possible to provide for air flow. Where water drainage does not permit this, MVMA details may be followed. Where the product extends to the soffit, an installation similar to typical brick installation may be performed, i.e. the soffit may be installed after the product is installed. Alternatively, the soffit j-channel may include a spacer against the wall to provide for air flow at the top of the wall.

Although not illustrated, in one embodiment, after the product is secured to the structure, a bead of caulk is optionally installed on the product along one of the top and bottom, plus one of the ends, so that the joint between adjacent products is filled with the caulk to provide a substantially effective water seal. In yet another embodiment, a bead of caulk or foam dam is provided on the top or bottom and one end of each stone at the factory to provide a substantially watertight joint between adjacent products without a field-applied caulk. In yet another embodiment, as noted above.

One skilled in the art appreciates that while not illustrated here, a grout product may optionally be installed between adjacent products for certain textures. Such a grout is preferably flexible, so that it can perform for an extended period without cracking. Such a grout is also preferably water resistant to minimize the amount of water that enters between adjacent products. Additionally, a grout may be used with the flanged design described above.

In the embodiment illustrated in FIG. 5, a bracket 514 optionally includes an integrally formed fastener. In this embodiment, in a manner similar to the bracket described in FIGS. 1 and 2, the top end 16 of the bracket 14 is formed in a manner such as illustrated in FIG. 5 and described below. In this embodiment, the top end 516 of the bracket 516 has a pointed end 530 to penetrate the structure and hold the product 510 to the structure. The upper surface 535 of the top end 516 is struck with a hammer (not shown) to embed the pointed end 530 into the structure in a manner similar to a nail. Preferably the surface 532 of the end 516 includes a rough surface similar to a ring nail to improve retention. In the event the end does not have sufficient engagement, the end may have a loop similar to that shown in FIG. I at 16 to permanently secure the end 516 with a separate fastener such as a nail, screw or staple as described above.

In yet another embodiment illustrated in FIG. 5A, the building includes an insulation product on the outer surface of the building, such as a foam board 546. In a manner similar to the embodiment described in FIG. 5, the stone is installed over a foam board 546, and the pointed end 530 of the bracket 516 penetrates the foam board 546 and rests against the outer surface 542' of the structure. A fastener is driven through a loop formed on the bracket 516' as described above with reference to FIG. 1. In this manner, the gap G1' is maintained between the product 510' and the foam board 546 to enable any moisture to escape, without the projection 534 crushing the upper surface 544' of the foam board 546.

FIGS. 13A and 13B illustrate an embodiment of a bracket 514' prior to being imbedded into a product (not shown). FIG. 13A illustrates a side view and FIG. 13B illustrates a side view of the bracket of this embodiment. The illustrated bracket 514' is particularly useful for installation over a softer material, such as insulation (in a manner similar to that illustrated in FIG. 5A), but without the bracket 514' having a pointed end (as shown in FIGS. 5 and 5A at 530, 530'). Thus, the bracket 514' does not project through the foam board (not shown). Instead, the bracket 514' includes a pair of lands 537 at the projections 534' to bear against the soft material (or the structure). As illustrated in FIGS. 13A and B, the lands may comprise a flat portion of the bracket 514', such as a washer or other flat piece welded or otherwise attached to the bracket 514'. In another embodiment of a bracket illustrated in FIGS. 14A and 14B, the bracket 514" includes a pair of lands 537' integrally formed in the bracket 514" in the form of coils. These lands 537' are similarly formed at the projections 537' so the lands bear against a softer material or the building structure (not shown). This lands 537 and 537' enable the bracket 514' and 514" to rest against the foam (not shown), and the gap illustrated in FIG. 5A. at G1' is maintained between the product 510' and the foam board 546 to enable any moisture to escape, without the upper end of the bracket crushing the upper surface of the foam board as described above with respect to FIG. 5A. In the embodiments illustrated in FIGS. 13A-14B, the brackets 514' and 514" each includes an end 518' and 518", respectively, with and aperture for a fastener to secure the top end of the bracket 516. Additionally, the land 537 and 537' may include an aperture for a fastener. One skilled in the art appreciates these are merely illustrative, and lands may be formed in, or attached to the brackets as appropriate to the particular design.

Figure 6A:
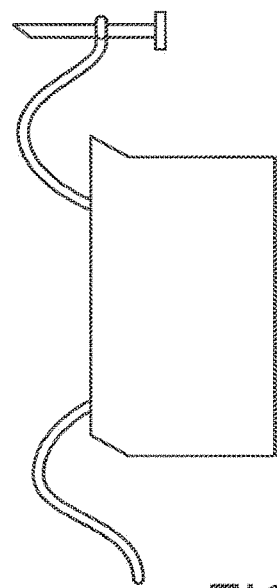
Figure 7:
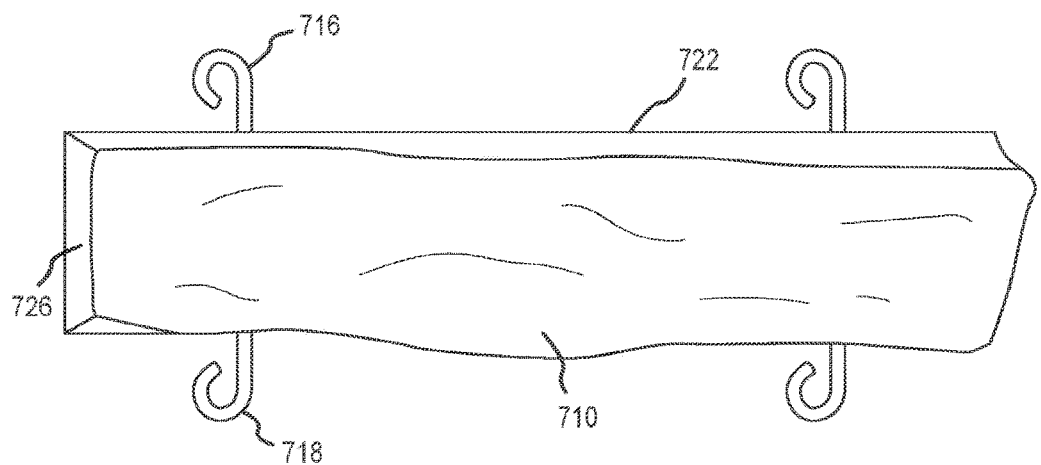
FIGS. 7-8 are representative front and side views of one illustrative texture according to the present invention.
Figure 8:
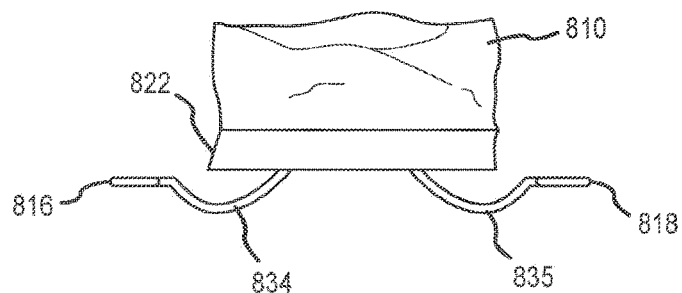
Figure 9:
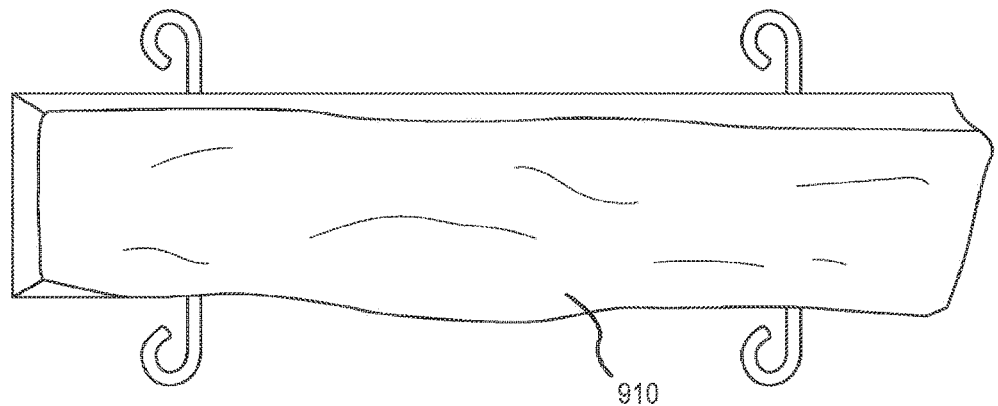
FIGS. 9-10 are representative front and side views of a second illustrative texture according to the present invention.
Figure 10:
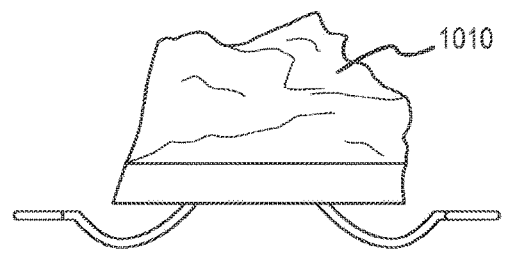
Figure 12B:
Figure 12A:
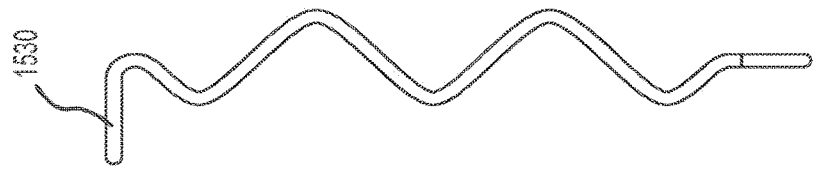
Figure 11B:
Figure 11A:
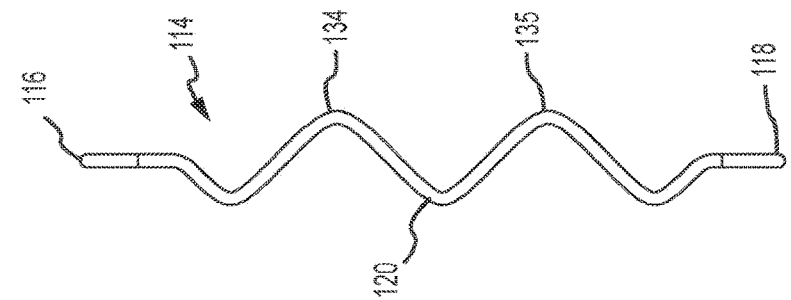

In another embodiment illustrated in FIGS. 6 and 6A, the product 610 includes brackets as described above with reference to FIG. 1, but a fastener 640, such as a nail or screw, is optionally installed through the loop 630 formed in the bracket 614 and shipped with the product. In this illustrated embodiment, the fastener 640 is held by an interference fit to the inside of the loop 630. In another embodiment, the fastener 640 is adhered, tack welded, or otherwise temporarily or permanently secured to the bracket 614. In these embodiments, the installer simply needs to carry a tool to secure the fastener 640, such as a hammer or screwdriver (depending on the fastener provided).

As illustrated in FIG. 1, the product 10 preferably includes at least two brackets 14, 14'. One skilled in the art appreciates that more than two brackets may be utilized to provide additional support and attachment. The nature of the product (size, weight) and the nature of the brackets, fasteners and structure and environment can affect these requirements. In the event a product must be cut to length, care should be taken to leave enough concrete remains to retain the bracket permanently. If the installer anticipates a bracket must be removed, the installer should consider finding a shorter product to avoid cutting the bracket or cutting the product. Alternatively, where required, the installer may cut both ends of a product to achieve the desired length while leaving both brackets intact. In some instances, an installer may choose to cut the end(s) of more than one stone to ensure all brackets are retained. One skilled in the art appreciates a product made according to the present invention may be cut in a conventional manner typically used to cut concrete, such as a Cultured Clean Cut (reference culturedcleancut.com), a masonry saw, grinder, hammer & chisel, guillotine cutter, and the like.

Alternatively, if the installer cuts a product to a length which causes the removal of one bracket from the product, while not illustrated here, in such an instance a new bracket is secured to the product 10 by either adhering or fastening a new bracket (such as a stamped metal bracket) to the back surface 32 of the product 10. This may be done with adhesive or using fasteners (such as Tapcon® screws into holes drilled into the back surface 32 of the product 10). One must take care to select a proper adhesive suitable for adhering the bracket to the product. In another embodiment, the present invention may be used in other applications, such as slate or composite roofing. In a similar manner, such brackets may be adhered in a similar fashion to natural stone or roofing products (such as slate). With roofing products, it is anticipated the products will be shingled, so the length of the protrusions 34, 35 must be adjusted to provide for such shingling of the roofing product. Furthermore, composite articles may have the brackets molded into the product.

Although not illustrated, the invention is also applied to corners and accessories, such as trim stones, keystones, ledges, light fixtures, outlets, column wraps and other products. In the case of corners, in one embodiment, only one side of the stone corners are attached to the structure, and a spacer is provided on the backside of the return to provide a consistent air gap and exterior thickness. In another embodiment, the installation instructions teach the installer to set a gap manually, or to use separate spacers, such as foam or molded parts. In another embodiment, the instant invention is applied to a panelized product. In such a case, it may be necessary to utilize a greater number of brackets to adequately support and secure the panelized product due to its size and weight.

In yet another embodiment, discrete bracket ends are utilized. While the brackets illustrated in the figures are unitary; i.e. both ends 16, 18 are formed from the same piece of wire as is the intermediate portion 20, and while the following is not illustrated here, one skilled in the art appreciates that the bracket 14 could comprise two discrete ends 16, 18 each having an opposite end embedded in the concrete and having substantially no intermediate portion 20. Furthermore, when installing the product over concrete, one should install the WRB as suggested by the MVMA and secure the product of the present invention through the WRB and directly to the block with appropriate fasteners, thus eliminating the need to ensure a secure chemical bond to the concrete block as required with ACMV products. Furthermore, the instant invention may be used in interior and other applications. In certain applications, the air gap may not be required (e.g. a dry interior application), and therefore the gap G1 may not be necessary and one skilled in the art will adapt the product accordingly.

One embodiment of the present invention is applied to individual stones or bricks. This makes installation simple, as fewer products will be cut and less scrap created. Furthermore, it avoids the potential that an installer will align the panels to create unsightly lines or an unattractive panelized wall. Additionally, the individual products also make it simpler to create accessory products that are compatible with this system. As noted above, however, applicant envisions that a panelized system could utilize the present invention, either alone or in combination with the individual products as described above.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A veneer product adapted for attachment to a building, comprising:

a body having a front surface and a back surface adapted for installation adjacent the building, a top surface, and a bottom surface;

a bracket attached to body and projecting away from the back surface, the bracket further comprising:
   a first end adjacent the top surface adapted for attachment to the building and a first means for positioning the back surface a predetermined distance from the building,
   a second end having a second means for positioning a second portion of the back surface a predetermined distance from the building, and
   a lower projection adjacent the bottom surface adapted for engagement with a body of a second veneer product attached to the building; and
wherein the bracket is a one-piece wire with an intermediate portion embedded within the body, and wherein the first end is adapted to selectively receive a fastener.

2. The veneer product of claim 1, further comprising a lip provided on one of the top surface and the bottom surface.

3. The veneer product of claim 1, further comprising left end and a right end, and a lip provided on one of the left end and the right end.

4. The veneer product of claim 1, wherein the veneer product is adapted to be interconnected to a building with a weather resistant barrier attached to an exterior surface thereof, and wherein the veneer product is installed over the weather resistant barrier to form an air gap between the weather resistant barrier and the back surface of the body.

5. The veneer product of claim 4, wherein the first means for positioning and second means of positioning space the back surface of the body to define the air gap.

6. A system for providing a weather resistant veneer cladded building, the system comprising:
   a weather resistant barrier adapted to be applied to the exterior surface of the building;
   at least two veneer products provided over the weather resistant barrier and attached to the exterior surface of the building, each veneer product comprising a body with a front surface, a back surface, a top side, and a bottom side; and
   a bracket attached to body, the bracket comprising a one-piece member with a portion embedded within the body, and further comprising:
      a first end adjacent the top side for attachment to the building and a first protrusion for positioning the back surface a predetermined distance from the exterior surface of the building,
      a second end having a second protrusion for positioning a second portion of the back surface a predetermined distance from the exterior surface of the building, and
      a bottom projection adjacent the bottom side for engagement with an adjacent veneer product to retain the bottom end.

7. The system of claim 6, wherein the exterior surface of the building further comprises an insulation product, wherein the bracket includes at least one of a land for resting against an outer surface of the insulation product and a projection for piercing the insulation product.

8. The veneer product of claim 6, wherein the first and second protrusions space the back surface of the body from the building to form an air gap between the back surface of the veneer products and the weather resistant barrier.

9. The system of claim 6, wherein each veneer product has a lip provided on one of the top side and the bottom side.

10. The system of claim 9, wherein the lip provides a gap between adjacent products.

11. The system of claim 9, wherein the lip substantially blocks the direct passage of rain between adjacent veneer products.

12. The system of claim 6, wherein each veneer product has a left end and a right end, and wherein each veneer product further comprises a lip provided on one of the left end and the right end.

13. The system of claim 6, further comprising a seal provided between each veneer product.

14. The system of claim 13, wherein the seal comprises a caulk product.

15. The system of claim 6, wherein the first end accommodates a fastener.

16. The system of claim 15, wherein the fastener is integrally formed in the first end.

* * * * *